United States Patent
Song

(10) Patent No.: US 10,344,685 B2
(45) Date of Patent: Jul. 9, 2019

(54) APPARATUS AND METHOD FOR DIAGNOSING ENGINE HAVING VARIABLE COMPRESSION RATIO APPARATUS

(71) Applicants: Hyundai Motor Company, Seoul (KR); Kia Motors Corporation, Seoul (KR)

(72) Inventor: Jae Hyeok Song, Busan (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/793,777

(22) Filed: Oct. 25, 2017

(65) Prior Publication Data

US 2018/0306126 A1    Oct. 25, 2018

(30) Foreign Application Priority Data

Apr. 21, 2017    (KR) .......... 10-2017-0051391

(51) Int. Cl.
| | | |
|---|---|---|
| *F02D 15/02* | (2006.01) | |
| *F02D 35/02* | (2006.01) | |
| *G01M 15/06* | (2006.01) | |
| *F02D 41/22* | (2006.01) | |

(52) U.S. Cl.
CPC .......... *F02D 15/02* (2013.01); *F02D 35/02* (2013.01); *F02D 41/22* (2013.01); *G01M 15/06* (2013.01); *F02D 2700/03* (2013.01)

(58) Field of Classification Search
CPC .......... F02D 15/00; F02D 15/02; F02D 35/02; F02D 2700/03; F02B 75/04; F02B 75/044; G01M 15/06
See application file for complete search history.

(56) References Cited

U.S. PATENT DOCUMENTS

| 4,834,031 A * | 5/1989 | Katoh ..................... F02B 75/04 |
| | | 123/48 R |
| 9,416,745 B2 * | 8/2016 | Hiyoshi ................ F02D 41/123 |
| 9,903,301 B2 * | 2/2018 | Shinozaki ............... F02D 15/02 |

FOREIGN PATENT DOCUMENTS

| JP | 2014-062494 A | 4/2014 |
| JP | 2015-194098 A | 11/2015 |
| KR | 10-0700851 B1 | 3/2007 |

* cited by examiner

*Primary Examiner* — Grant Moubry
(74) *Attorney, Agent, or Firm* — Morgan, Lewis & Bockius LLP

(57) ABSTRACT

An apparatus for diagnosing an engine including a variable compression ratio apparatus according to an exemplary embodiment of the present invention, may include a piston configured to reciprocally move in a cylinder of the engine, a detector configured to determine a position of the piston, a variable compression ratio apparatus configured to adjust a moving range of the piston, and a controller configured to determine whether the variable compression ratio apparatus is defective based on a position signal of the piston determined by the detector.

5 Claims, 5 Drawing Sheets

APPARATUS AND METHOD FOR DIAGNOSING ENGINE HAVING VARIABLE COMPRESSION RATIO APPARATUS

CROSS-REFERENCE(S) TO RELATED APPLICATIONS

The present application claims priority to Korean Patent Application No. 10-2017-0051391, filed on Apr. 21, 2017, the entire contents of which are incorporated herein for all purposes by this reference.

BACKGROUND OF THE INVENTION

Field of the Invention

The present invention relates to an apparatus and a method for diagnosing an engine including a variable compression ratio apparatus. More particularly, the present invention relates to an apparatus and a method for diagnosing an engine including a variable compression ratio apparatus which is robust to vibration generated by operation of the engine or noise by combustion gas having a high temperature generated by the engine.

Description of Related Art

In general, thermal efficiency of a heat engine is increased when a compression ratio is high, and thermal efficiency of a spark ignition engine is increased when an ignition timing is advanced up to a predetermined level. However, when the ignition timing is advanced in a high compression ratio, abnormal combustion may be generated in the spark ignition engine which causes damage to the engine, wherein there is a limit to the advance of the ignition timing and thus it is necessary to prevent output deterioration.

A variable compression ratio (VCR) apparatus is an apparatus configured for changing a compression ratio of a mixer according to an operation condition of the engine. According to the variable compression ratio apparatus, fuel efficiency is improved by increasing the compression ratio of the mixer in a low load condition of the engine, and a generation of knocking is prevented and the engine output is improved by decreasing the compression ratio of the mixer in a high load condition of the engine.

In the variable compression ratio apparatus in the related art, a change in the compression ratio is implemented by changing a length of a connecting rod for connecting a piston and a crankshaft. As a type of variable compression ratio apparatus, a member configured for connecting the piston and the crankshaft includes a plurality of links, wherein combustion pressure is directly transferred to the links.

However, when the compression ratio among the cylinders differs from each other by failure of at least one of the VCR apparatuses, there are problems of unitability of combustion and vibrational noise of the engine.

Accordingly, there exists a need for research on a method for diagnosing an operating condition of the VCR apparatus.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus and a method for diagnosing an engine including a variable compression ratio apparatus which may accurately diagnose an operating condition of a VCR apparatus.

Furthermore, various aspects of the present invention are directed to providing an apparatus and a method for diagnosing an engine including a variable compression ratio apparatus which is robust to vibration generated by operation of the engine or noise by a combustion gas having a high temperature generated from the engine.

According to an exemplary embodiment of the present invention, an apparatus for diagnosing an engine including a variable compression ratio apparatus includes a piston configured to reciprocally move in a cylinder of the engine, a detector configured to determine a position of the piston, a variable compression ratio apparatus configured to adjust a moving range of the piston, and a controller configured to determine whether the variable compression ratio apparatus is defective based on a position signal of the piston determined by the detector.

The controller may determine an approximate expression of the position signal through a regression analysis, and may determine whether the variable compression ratio apparatus is defective based on the approximate expression.

The controller may approximate the position signal of the piston to a second order expression and may determine whether the variable compression ratio apparatus is defective from an extremum of the second order expression.

The detector may be a magnetic detector disposed in a cylinder block, and the magnetic detector may be configured to determine a position signal of the piston from a variation of a magnetic signal in accordance with a connecting rod bushing provide on the piston.

Various aspects of the present invention are directed to providing a method for diagnosing an engine including a variable compression ratio apparatus, the method including: determining, by a detector, a position signal of a piston reciprocally moving in a cylinder; approximating, by a controller, the position signal of the piston; and determining, by the controller, whether the variable compression ratio apparatus for adjusting a moving range of the piston is defective based on the approximated position signal of the piston.

In the determining, the position signal of the piston may be approximated to a second order expression through a regression analysis.

The operating condition of the variable compression ratio apparatus may be determined based on an extremum of the second order expression.

According to an exemplary embodiment of the present invention, the position signal of the piston is approximated to a polynomial equation and it is possible to exactly determine whether the variable compression ratio apparatus is defective from the approximated position signal of the piston.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
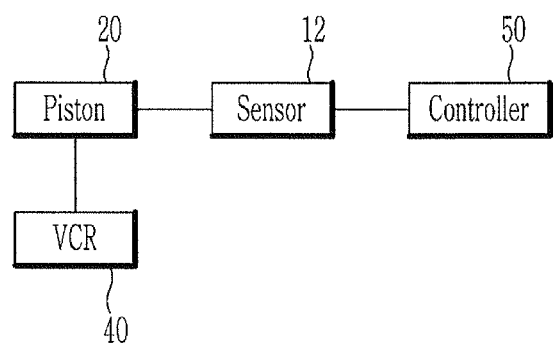
FIG. 1 is a block diagram illustrating an apparatus for diagnosing an engine including a variable compression ratio apparatus according to an exemplary embodiment of the present invention.
Figure 2:
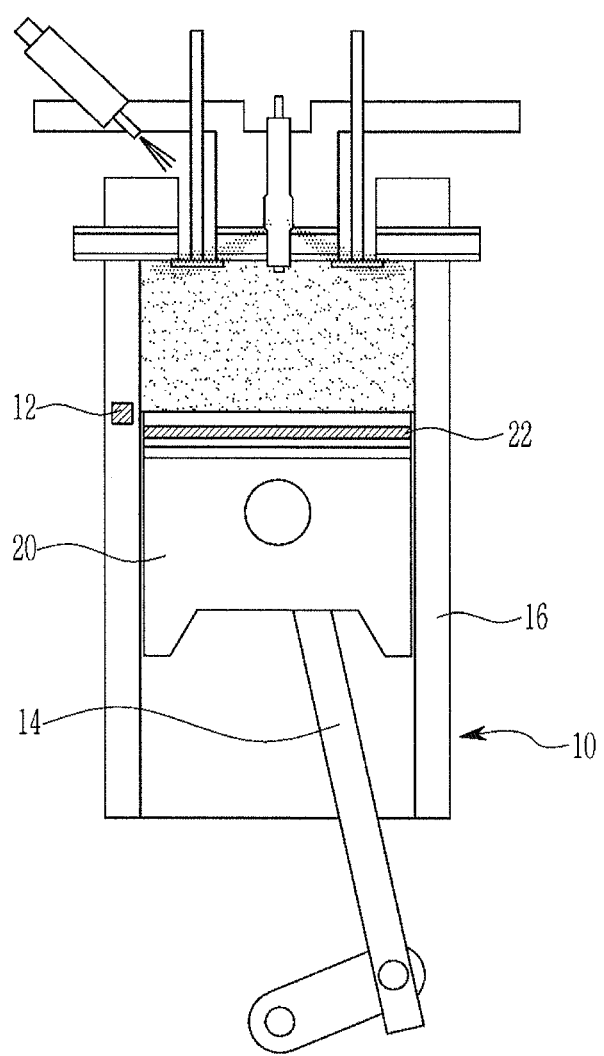
FIG. 2 is a schematic view illustrating a piston and a detector according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in portion by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit or scope of the invention as defined by the appended claims.

In describing the present invention, members that are not related to the description will be omitted.

It is understood that the term "vehicle" or "vehicular" or other similar term as used herein is inclusive of motor vehicles in general including passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, and other alternative fuel vehicles (e.g. fuels derived from resources other than petroleum).

Additionally, it is understood that the exemplary processes may be performed by one or a plurality of controllers. It is understood that the term controller/control unit/control device refers to a hardware device that includes a memory and a processor. The memory is configured to store the modules, and the processor is configured to execute the modules to perform one or more processes which are described further below.

Furthermore, control logic of the present invention may be embodied as non-transitory computer readable media on a computer readable medium including executable program instructions executed by a processor, controller/control device, or the like. Exemplary embodiments of the computer readable mediums include, but are not limited to, ROM, RAM, compact disc (CD)-ROMs, magnetic tapes, floppy disks, flash drives, smart cards, and optical data storage devices. The computer readable recording medium can also be distributed in network coupled computer systems wherein the computer readable media is stored and executed in a distributed fashion, e.g., by a telematics server or a Controller Area Network (CAN).

Hereinafter, an apparatus for diagnosing an engine including a variable compression ratio apparatus will be described in detail with reference to accompanying drawings.

FIG. 1 is a block diagram illustrating an apparatus configured for diagnosing an engine including a variable compression ratio apparatus according to an exemplary embodiment of the present invention.

As shown in FIG. 1, the apparatus for diagnosing an engine including a variable compression ratio apparatus according to an exemplary embodiment of the present invention may include a piston 20 which reciprocally moves in a cylinder of an engine, a detector 12 which determines a position of the piston 20, a variable compression ratio apparatus 40 which adjusts a moving range of the piston 20, and a controller 50 configured to determine whether the variable compression ratio apparatus 40 is defective from a position signal of the piston 20 determined from the detector 12.

The engine 10 includes a plurality of cylinders, each generating driving torque by burning fuel. The piston 20 moves upward and downward in the cylinder, and transmits power generated by a combustion of fuel in the cylinder to a connecting rod 14.

The detector 12 determines the position of the piston 20 reciprocally moving in the cylinder, and the position signal of the piston 20 determined from the detector 12 is transmitted to the controller 50. The detector 12 may be a magnetic detector 12 disposed in a cylinder block 16. The magnetic detector 12 may determine the position of the piston 20 from a variation of a magnetic signal which is generated from a variation of a connecting rod bushing 22 provided on the piston 20.

Since the piston 20 includes nonmagnetic material including an aluminum alloy, it is impossible to determine the position of the piston 20 by the magnetic detector 12. Therefore, the position of the piston 20 may be determined from a variation in position of the connecting rod bushing 22 which includes magnetic material including cast iron alloy by the magnetic detector 12. However, the method of determining a position of the piston 20 according to an exemplary embodiment of the present invention is not limited thereto, and may include another method of determining the position of the piston 20.

The variable compression ratio apparatus (VCR) 40 is mounted in the engine 10 which rotates a crankshaft by the power generated in the cylinder, and changes a compression ratio of the engine.

The variable compression ratio apparatus 40 may change the compression ratio by adjusting a moving range of the piston 20. The variable compression ratio apparatus is widely known in the art, so a more detailed description thereof will be omitted in the present embodiment.

The controller 50 may determine whether the variable compression ratio apparatus 40 is defective from the position signal determined by the detector 12. For the present case, the controller may be implemented by one or more processors operated by a predetermined program, in which the predetermined program is configured to perform steps of a method for diagnosing an engine including a variable compression ratio apparatus according to an exemplary embodiment of the present invention Hereinafter, a method for diagnosing the engine including the variable compression ratio apparatus will be described in detail with reference to accompanying drawings.

Figure 3:
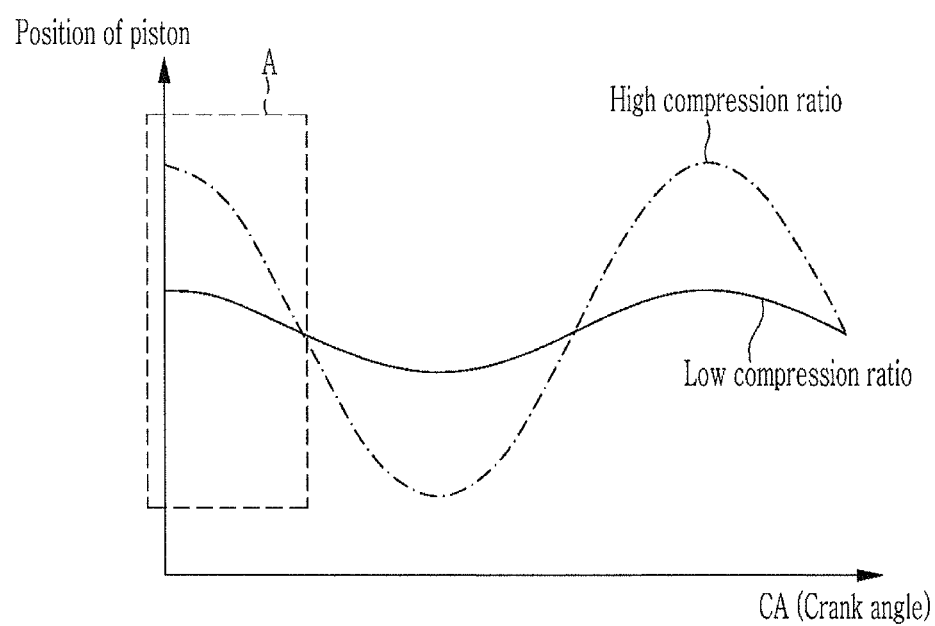
FIG. 3 is a graph illustrating a position signal of the piston according to an exemplary embodiment of the present invention.
Figure 4:
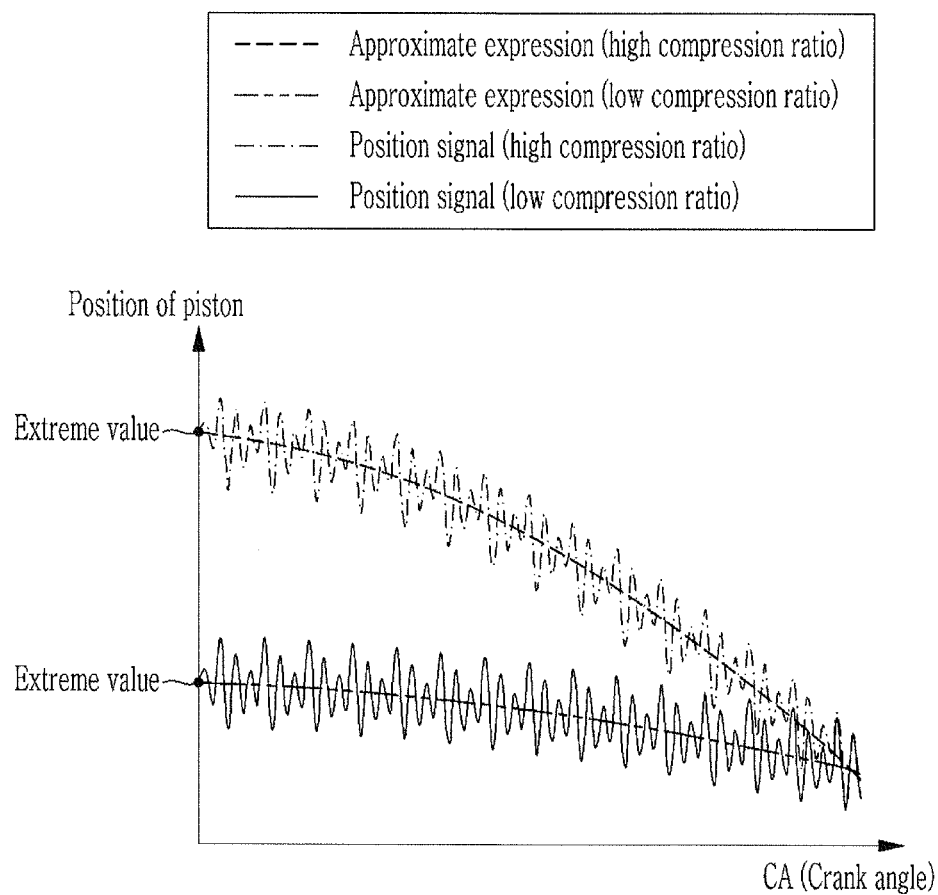
FIG. 4 is an enlarged graph illustrating region A of FIG. 3 according to an exemplary embodiment of the present invention.
Figure 5:
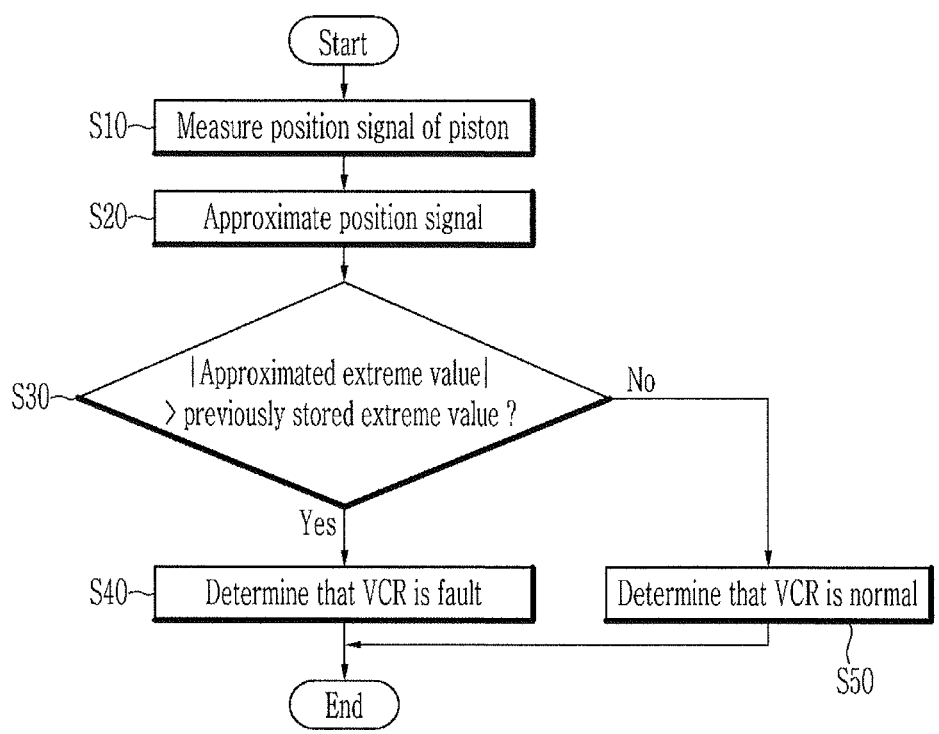
FIG. 5 is a flowchart illustrating a method for diagnosing an engine including a variable compression ratio apparatus according to an exemplary embodiment of the present invention.

FIG. 3 is a graph illustrating a position signal of the piston according to an exemplary embodiment of the present invention. FIG. 4 is an enlarged graph illustrating region A of FIG. 3. FIG. 5 is a flowchart illustrating a method for diagnosing an engine including a variable compression ratio apparatus according to an exemplary embodiment of the present invention.

Referring to FIG. 5, the detector 12 determines the position of the piston 20, and the position signal of the piston 20 determined by the detector 12 is transmitted to the controller 50 (S10).

As shown in FIG. 3 and FIG. 4, a vibration component generated from an operation of the engine and a noise component generated by combustion gas having a high temperature included in the position signal determined by the detector 12. Therefore, when the variable compression ratio apparatus 40 is determined defective using only the position signal of the piston 20, the determination of the state of the VCR 40 may be inaccurate.

To solve the above problem, the controller 50 is configured to approximate the position signal of the piston 20 determined by the detector 12 (S20). The controller 50 approximates the position signal of the piston 20 to a second order expression through a regression analysis. The engine 10 disposed in a vehicle may be operated by a four stroke method (intake-compression-combustion-exhaust). Accordingly, the position signal of the piston 20 may be expressed as a harmonic function. At the present time, referring to region A of FIG. 3, a portion of the position signal of the piston 20 (e.g., ¼ period from a top dead center of the piston), the position signal of the piston 20 may be expressed as a secondary polynomial.

The controller 50 is configured to determine whether the variable compression ratio apparatus 40, adjusting the moving range of the piston 20, is defective based on the position signal of the piston 20 approximated to the second order expression. The controller 50 may determine whether the variable compression ratio apparatus 40 is defective based on an extremum of the position signal of the piston 20 approximated to the secondary polynomial.

Referring to FIG. 3 and FIG. 4, extrema of the position signal corresponding to a high compression ratio and a low compression ratio are stored in the controller 50 when the variable compression ratio apparatus 40 is operated normally. The controller 50 is configured to compare the extrema of the position signal approximated as the secondary polynomial with the previously stored extrema corresponding to the high compression ratio and the low compression ratio (S30).

When a difference between the extrema of the position signal approximated as the secondary polynomial and the previously stored extrema corresponding to the high compression ratio and the low compression ratio exceeds a predetermined range, the controller 50 is configured to determine that the variable compression ratio apparatus 40 is defective (S40).

When the difference between the extrema of the position signal approximated as the secondary polynomial and the previously stored extrema corresponding to the high compression ratio and the low compression ratio is within the predetermined range, the controller 50 is configured to determine that the variable compression ratio apparatus 40 is operating normally (S50).

Since the position signal of the piston 20 is approximated as the second order expression, a position of the top dead center or a bottom dead center of the piston 20 may be determined when the extrema of the approximated position signal is determined. Accordingly, it is possible to determine whether the variable compression ratio apparatus 40 is defective by comparing the extrema of the position signal approximated as the secondary polynomial with the previously stored extrema corresponding to the high compression ratio and the low compression ratio.

As described above, according to an exemplary embodiment of the present invention, a portion of the position signal of the piston 20 is approximated to a secondary polynomial, and it is possible to determine whether the variable compression ratio apparatus 40 is defective based on the position signal of the piston 20 approximated to the secondary polynomial. Accordingly, it is possible to provide a method for diagnosing an engine including a variable compression ratio apparatus robust to vibration generated by an operation of the engine or noise by combustion gas having a high temperature.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustrative and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for diagnosing an engine having a variable compression ratio apparatus, the apparatus comprising:
   a piston reciprocally moving in a cylinder of the engine;
   a detector configured to determine a position of the piston;
   the variable compression ratio apparatus configured to adjust a moving range of the piston; and
   a controller configured to determine whether the variable compression ratio apparatus is defective based on a position signal of the piston determined by the detector,
   wherein the controller is configured to determine an approximate expression of the position signal through a regression analysis, and determine whether the variable compression ratio apparatus is defective based on the approximate expression of the position signal.

2. The apparatus of claim 1, wherein the controller is configured to approximate the position signal of the piston to a second order expression and determine whether the variable compression ratio apparatus is defective from an extremum of the second order expression.

3. The apparatus of claim 1, wherein the detector is a magnetic detector disposed in a cylinder block, and wherein the magnetic detector is configured to determine the position signal of the piston from a variation of a magnetic signal in accordance with a connecting rod bushing provided on the piston.

4. A method for diagnosing an engine having a variable compression ratio apparatus, the method comprising:
   determining, by a detector, a position signal of a piston reciprocally moving in a cylinder;
   approximating, by a controller, the position signal of the piston; and
   determining, by the controller, when the variable compression ratio apparatus for adjusting a moving range of the piston is defective based on the approximated position signal of the piston,
   wherein in the approximating of the position signal of the piston, the controller approximates the position signal of the piston to a second order expression through a regression analysis.

5. The method of claim 4, wherein an operating condition of the variable compression ratio apparatus is determined based on an extremum of the second order expression.

* * * * *